(12) United States Patent
Komatsu et al.

(10) Patent No.: US 7,271,980 B2
(45) Date of Patent: Sep. 18, 2007

(54) DISK CHUCKING MECHANISM HAVING A FAN-SHAPED DRIVING PIN

(75) Inventors: Hisateru Komatsu, Yamagata (JP); Makoto Konno, Yamagata (JP); Noriyuki Kobayashi, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 385 days.

(21) Appl. No.: 11/065,820

(22) Filed: Feb. 25, 2005

(65) Prior Publication Data

US 2005/0286165 A1   Dec. 29, 2005

(30) Foreign Application Priority Data

Jun. 24, 2004   (JP) .............................. 2004-186632

(51) Int. Cl.
*G11B 17/02*   (2006.01)
(52) U.S. Cl. .................................. 360/99.04
(58) Field of Classification Search .......... 360/99.04, 360/99.08, 99.05, 99.12; 720/615, 604, 721, 720/723
See application file for complete search history.

(56) References Cited

U.S. PATENT DOCUMENTS

| | | | | |
|---|---|---|---|---|
| 4,896,232 A | * | 1/1990 | Sugawara | 360/99.04 |
| 5,805,378 A | | 9/1998 | Konno et al. | |
| 5,825,586 A | * | 10/1998 | Teshima | 360/99.04 |
| 6,243,229 B1 | * | 6/2001 | Furuki | 360/99.04 |
| 6,259,581 B1 | * | 7/2001 | Sawada | 360/99.04 |
| 6,259,582 B1 | * | 7/2001 | Sawada et al. | 360/99.04 |
| RE37,503 E | * | 1/2002 | Aruga et al. | 360/99.05 |
| 6,747,831 B2 | | 6/2004 | Komatsu et al. | |
| 6,775,096 B2 | * | 8/2004 | Wauke | 360/99.04 |
| 6,943,983 B2 | * | 9/2005 | Komatsu et al. | 360/99.04 |
| 2001/0006331 A1 | | 7/2001 | Shibata et al. | |
| 2001/0006332 A1 | | 7/2001 | Shibata et al. | |
| 2003/0174438 A1 | | 9/2003 | Komatsu et al. | |

FOREIGN PATENT DOCUMENTS

| | | |
|---|---|---|
| JP | 9-91859 A | 4/1997 |
| JP | 9-97493 A | 4/1997 |
| JP | 9-97839 A | 4/1997 |
| JP | 2664995 B2 | 6/1997 |
| JP | 2000-245125 A | 9/2000 |
| JP | 2001-178185 A | 6/2001 |
| JP | 2001-184774 A | 7/2001 |
| JP | 2001-190055 A | 7/2001 |
| JP | 2003-272370 A | 9/2003 |

* cited by examiner

*Primary Examiner*—Allen Cao
(74) *Attorney, Agent, or Firm*—Frishauf, Holtz, Goodman & Chick, P.C.

(57) ABSTRACT

In a disk chucking mechanism for use in a flexible disk drive adopting a spindle motor (300) of a Hall sensor-less method, a driving pin (317A) freely received in a driving oval hole (46b) of a flexible disk (40) has a shape (shape of fan) where a catch factor portion is cut so that the driving pin (317A) is not in contact with an inner edge of the driving oval hole (46b) as much as possible when a rotor (310A) of the spindle motor (300) rotates in the opposite direction (counterclockwise).

6 Claims, 12 Drawing Sheets

DISK CHUCKING MECHANISM HAVING A FAN-SHAPED DRIVING PIN

This application claims priority to prior Japanese patent application JP 2004-186632, the disclosure of which is incorporated herein by reference.

BACKGROUND OF THE INVENTION

This invention relates to a flexible or floppy disk drive and, in particular, to a disk chucking mechanism therefor.

In the manner which is well known in the art, the flexible disk drive (which may be hereinafter called "FDD" for short) of the type is a device for carrying out data recording and reproducing operation to and from a disk-shaped magnetic recording medium of the flexible disk (which may be hereinafter called "FD" for short or may be called "a medium") loaded therein. In addition, such a flexible disk drive is mounted or loaded in a portable electronic equipment such as a laptop personal computer, a notebook-size personal computer, a notebook-size word processor, or the like.

The flexible disk drive of the type comprises a magnetic head for reading/writing data from/to the magnetic recording medium of the flexible disk, a carriage assembly for supporting the magnetic head at a tip thereof with the magnetic head movably along a predetermined radial direction to the flexible disk, a stepping motor for moving the carriage assembly along the predetermined radial direction, and a spindle motor for rotatably driving the magnetic recording medium with the floppy disk held. The spindle motor is one of direct-drive (DD) motors.

In order to control such a flexible disk drive, an FDD control apparatus is already proposed. By way of example, Japanese Unexamined Patent Application Publication No. H9-97,493 or JP-A 9-97493 discloses, as the FDD control apparatus, one integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. The CTL control circuit may be called a logic circuit. This IC chip is generally implemented by a metal oxide semiconductor (MOS) IC chip where a number of MOS field effect transistors (FETs) are integrated therein.

The FDD control apparatus comprises not only the one IC chip but also a spindle motor IC chip for controlling drive of the spindle motor. The spindle motor IC chip is implemented by a bipolar IC chip where a number of bipolar transistors are integrated therein.

Now, flexible disk drives have different specifications due to customers or users. The specification defines, for example, drive select 0 or 1, the presence or absence of a special seek function, the presence or absence of an automatic chucking function, a difference of logic for a density out signal, a difference of logic for a mode select signal, 1M mode 250 kbps or 300 kbps, and so on. If development is made of one IC chips which individually satisfy the different specification, a number types of one IC chips must be prepared. In order to avoid this, a one IC chip having a selectable function circuit is already proposed, for example, in Japanese Unexamined Patent Application Publication No. H9-97,839 or JP-A 9-97839 wherein all functions satisfying all specifications are preliminarily incorporated therein and one of the functions is selected in accordance with a particular specification.

In the manner which is well known in the art, the flexible disk driven by the flexible disk drive includes a disk-shaped magnetic recording medium accessed by the magnetic head. The magnetic recording medium has a plurality of tracks on a surface thereof that serve as paths for recording data and that are formed in a concentric circle along a radial direction. The flexible disk has eighty tracks on one side which include the most outer circumference track (which is named "$TR_{00}$") and the most inner circumference track (which is named "$TR_{79}$"). The most outer circumference track $TR_{00}$ is herein called the most end track.

It is necessary to position the magnetic head at a desired track position in a case where the flexible disk is accessed by the magnetic head in the flexible disk drive. For this purpose, the carriage assembly for supporting the magnetic head at the tip thereof must be positioned. Inasmuch as the stepping motor is used as a driving arrangement for driving the carriage assembly, it is possible for the flexible disk drive to easily carry out the positioning of the carriage assembly. In spite of this, it is necessary for the flexible disk drive to detect only the position of the most end track $TR_{00}$ in the magnetic recording medium of the flexible disk loaded therein. In order to detect the position of the most end track $TR_{00}$, the carriage assembly is provided with an interception plate which projects from a base section thereof downwards and a photointerrupter is mounted on a substrate in the vicinity of a main frame opposed to the carriage assembly. For example, see Japanese Unexamined Patent Application Publication No. H9-91,859 or JP-A 9-91859 corresponding to U.S. Pat. No. 5,805,378. That is, it is possible to detect that the magnetic head is laid in the position of the most end track $TR_{00}$ in the magnetic recording medium of the flexible disk because the interception plate intercepts an optical path in the photointerrupter. Such a track position detecting mechanism is called a "00 sensor" in the art.

In the flexible disk drive where the DD (direct-drive) motor such as a spindle motor is used for rotatably driving the flexible disk, an index signal is generated on the basis of operation in periphery of a rotor of the DD motor. More specifically, a single-pole magnetized magnet (e.g. only a north pole is exposed to the outside) is provided with a peripheral side surface of a disk-shaped casing composing the rotor. Such a magnet is called an index detection magnet. In addition, on a main frame on which a stator of the DD motor and so on are mounted, a main printed wiring board on which a predetermined circuit is formed is disposed. A Hall element is located on the main printed wiring board at a predetermined position corresponding to the outside of the rotor. The Hall element is called an index detection Hall element.

Herein, the Hall element is a semiconductor element applying a Hall effect. The Hall effect is a phenomenon where an electric field occurs in a conductor in a y-direction perpendicular to both of an x-direction and a z-direction when the electric current flows in the x-direction in the conductor and when the magnetic field is applied in the z-direction perpendicular to the x-direction. The electric field caused thereby is a Hall electric field and an output of the Hall element in response thereto is a Hall output.

In addition, Hall elements are used not only as the index detection Hall element but also for detecting a position in the rotor of the spindle motor. Such Hall elements are called position detection Hall elements. A spindle motor using the position detection Hall elements is called a Hall motor.

Although the Hall motor requires three position detection Hall elements, in order to omit their position detection Hall elements, proposal is made to a new motor where states of currents flowing in three-phase coils of the stator are switched on the basis of polarity of an electromotive force induced in one of the three-phase coils that is put into a high-impedance state (e.g. see Japanese Unexamined Patent Application Publication No. 2000-245,125 or JP-A2000-245125). Such a control method where the position detection Hall elements are omitted from the motor is called a Hall sensor-less method among throughout the instant specification.

In the manner which is described above, in prior art, a single-pole magnetized magnet is used as the index detection magnet. It is difficult to obtain a stable generation timing for the index signal. Accordingly, in order to obtain the stable generation timing for the index signal, the present co-inventors already proposes and files an application to use, as the index detection magnet, a double-pole magnetized magnet (that is, one where a south pole and a north pole are put side by side) (see Japanese Unexamined Patent Application Publication No. 2001-190,055 or JP-A 2001-190055 corresponding to US Publication No. 2001-006332).

A conventional flexible disk drive comprises not only a main frame but also a motor frame for mounting the spindle motor for rotatably driving the medium thereon. This is because it is necessary to form a frequency generation pattern for detecting a rotation speed of the spindle motor on a printed wiring board and it is necessary to mount the printed wiring board on the motor frame. Accordingly, the conventional flexible disk drive is disadvantageous in that it requires a lot of parts and the number of processes for assembling increases. In order to resolve this problem, the present assignee have already proposed a method of controlling the rotation speed of the spindle motor without use of the frequency generation pattern (see Japanese Unexamined Patent Application Publication No. 2001-178185 or JP-A 2001-178185 corresponding to US Publication No. 2001-006331) and have already proposed a flexible disk drive comprising a motor frame portion for mounting the spindle motor thereon that is constituted by one piece integrated by the main frame (see Japanese Unexamined Patent Application Publication No. 2001-184774 or JP-A 2001-184774 corresponding to U.S. Pat. No. 6,747,831).

A flexible disk drive where a main frame and a sub-frame of a lower cover are combined to act the function as one frame is disclosed in Japanese Unexamined Patent Application Publication No. 2003-272370 or JP-A 2003-272370 which corresponds to US Publication No. 2003-174438). According to JP-A 2003-272370, the main frame has a structure which has the dimensions to permit mounting of only the high-accuracy part and from which the front surface of the frame is cut off. The lower cover covering the under surface of the main frame is provided with a function as the sub-frame to be mounted with low-accuracy parts corresponding to the front section of the frame subjected to the cutting off.

A disk chucking mechanism having a driving pin (projection) engaged with a driving oval hole is disclosed in Japanese Patent Publication No. 2,664,995 or JP-B 2,664,995. According to JP-B 2,664,995, the driving pin (projection) has first and second contact parts. The first contact part is pressed to an inner edge of the driving oval hole (a positioning hole) in an outer periphery side of the disk table (turntable). The second contact part is pressed to an inner edge of the driving oval hole (the position hole) in an upper stream side of the disk table (turntable) in a rotation direction.

In the manner which will later be described in conjunction with FIGS. 1 through 12, in a conventional flexible disk drive comprising a spindle motor of a Hall sensor-less method, a rotor of the spindle motor may rotate in the opposite direction to an original rotation direction on turning the spindle motor on in a synchronous operation. When the rotor of the spindle motor rotates in the opposite direction, the driving pin is in contact with the driving oval hole at an inner periphery edge. As a result, a tip portion of a spindle shaft is put into a shifted stated within a disk center hole of the disk hub. Although the spindle motor is switched into a normal rotation operation in such a state, the tip portion of the spindle shaft may not be completely turned back to a normal position. In other words, eccentricity may occur. That is, mischucking may occur because the rotor of the spindle motor rotates in the opposite direction. As a result, it makes reliability of the flexible disk drive lower.

SUMMARY OF THE INVENTION

It is therefore an object of the present invention to provide a disk chucking mechanism, which comprises a driving pin (projection) having a shape so as to do not contact with an inner edge of a driving oval hole as much as possible when a rotor of a spindle reversely rotates.

It is another object of the present invention to provide a disk chucking mechanism of the type described, which is capable of avoiding probability of mischucking as much as possible.

It is still another object of the present invention to provide a flexible disk drive, which is capable of improving reliability thereof.

Other objects of this invention will become clear as the description proceeds.

On describing the gist of an aspect of this invention, it is possible to be understood that a disk chucking mechanism is for chucking a disk hub made of ferromagnetic metal mounted in a center portion of a flexible disk in order to rotatably driving, by a spindle motor of a Hall sensor-less method, the flexible disk inserted in a flexible disk drive. The spindle motor comprises a rotor including a disk-shaped metallic casing and a spindle shaft. The disk hub has a disk center hole formed in the center portion thereof and a driving oval hole formed at a position eccentric with the disk center hole. The disk chucking mechanism is mounted on a protruding portion formed at a center of the disk-shaped metallic casing to protrude upward. According to the aspect of this invention, the above-mentioned disk chucking mechanism comprises a disk table mounted on the protruding portion. The disk table is for holding the disk hub. The disk table is made of plastic magnet for magnetically attracting the disk hub. The disk table has a center portion at which a tip portion of the spindle shaft to be received in the disk center hole passes through. The disk table has a hole at a position corresponding to the driving oval hole. A driving pin is freely received in the driving oval hole. The driving pin has a shape where a catch factor portion is cut. A supporting member is rotatably mounted on a rear surface of the protruding portion around a fulcrum in a plane in parallel with the disk table. The supporting member supports the driving pin at a free end thereof with the driving pin projected through a hole of the protruding portion and the hole of the disk table.

DESCRIPTION OF THE PREFERRED EMBODIMENT

Figure 1:
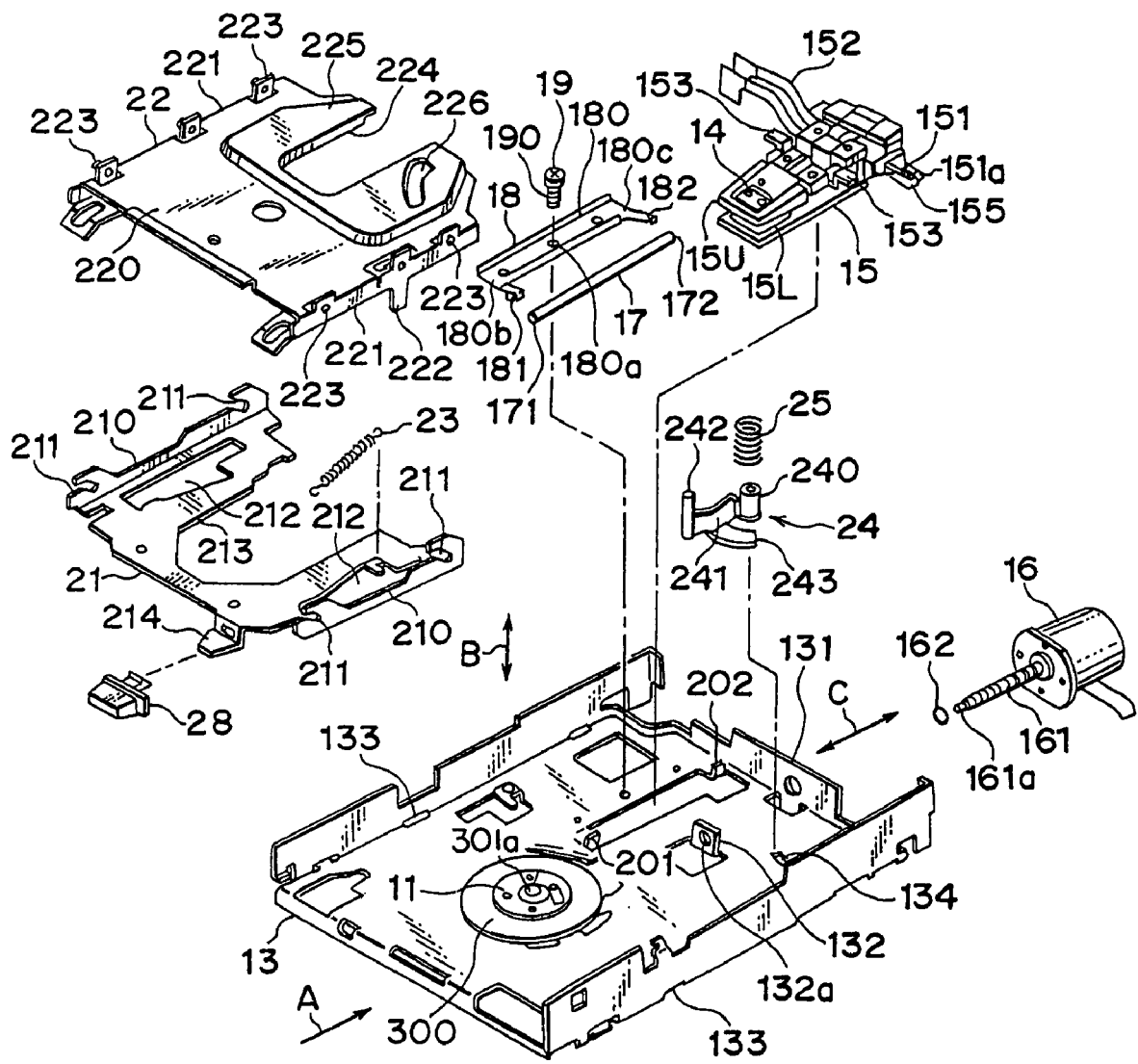
FIG. 1 is an exploded perspective view showing a main part of a conventional flexible disk drive.
Figure 2:
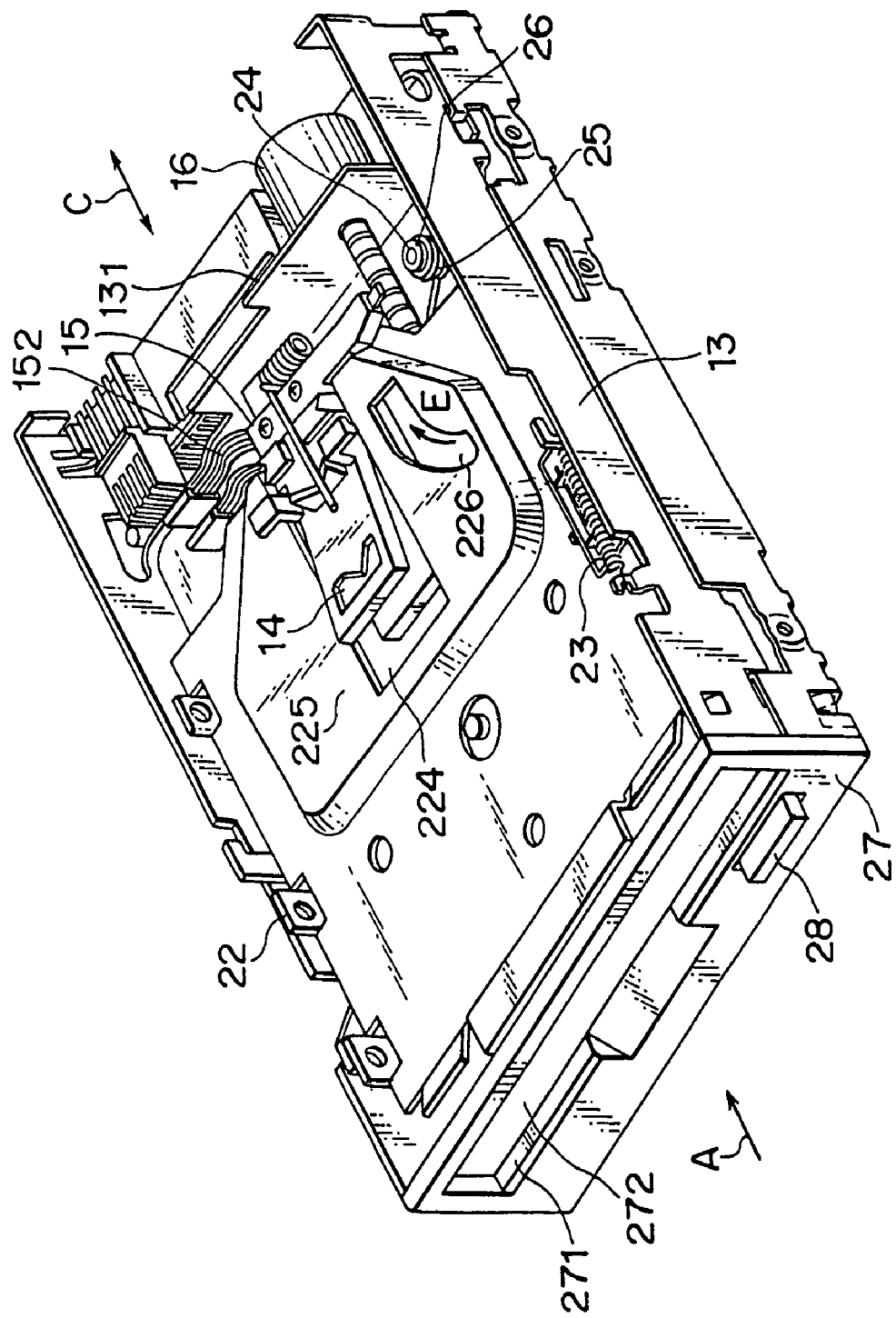
FIG. 2 is a schematic perspective view of the flexible disk drive illustrated in FIG. 1 as view from front obliquely.

Referring to FIGS. 1 and 2, a conventional flexible disk drive of a 3.5-inch type will be described at first in order to facilitate an understanding of the present invention. The illustrated flexible disk drive has a frame structure proposed in the above-mentioned U.S. Pat. No. 6,747,831. FIG. 1 is an exploded perspective view of the conventional flexible disk drive. Although the conventional flexible disk drive has a front panel and a case, they are omitted in FIG. 1. FIG. 2 is a perspective view of the conventional flexible disk drive viewing from a front side. An upper cover (the case) is omitted in FIG. 2.

The illustrated flexible disk drive is a device for driving a flexible disk of a 3.5-inch type (which will later be described). The flexible disk is loaded or inserted in the flexible disk drive from a direction indicated by an arrow A in FIGS. 1 and 2. The loaded flexible disk is held on a disk table 11 having a spindle shaft which will later be described. In this event, the spindle shaft coincides with a center axis of the flexible disk. In the manner which will later be described, the disk table 11 is rotatably supported on a frame main surface of the main frame 13. Accordingly, the spindle shaft of the disk table 11 has an axial direction B which extends in parallel with a thick direction of the main frame 13. The disk table 11 is rotatably driven by a spindle motor or a direct-drive (DD) motor 300, which is mounted on a concave portion of the main frame 13 in the manner which will later be described, thereby a magnetic recording medium of the flexible disk rotates. In addition, on a frame back surface of the main frame 13 is attached a main printed wiring board (not shown) on which a number of electronic parts (not shown) are mounted.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the frame main surface of the main frame 13 and is apart from the main frame 13 in the manner which will later be described. The carriage assembly 15 supports the magnetic heads 14 at the tip thereof movably along a predetermined radial direction (i.e. a direction indicated by an arrow C in FIGS. 1 and 2) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the frame main surface of the main frame 13 by cutting and bending. By the hole 132a and the steel ball 162, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which engages with the root in the male screw of the driving shaft 161. A spring 155 extends from the lower carriage 15L in substantially parallel with the arm 151. That is, the driving shaft 161 of the stepping motor 16 is put between the arm 151 and the spring 155.

Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for linearly moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the frame main surface of the main frame 13. However, because support occurs by the driving shaft 161, it is difficult to dispose the whole of the carriage assembly 15 apart from the frame main surface of the frame 13. For this purpose, a guide bar 17 supports and guides the carriage assembly 15 at another side thereof. The guide bar 17 is opposed to the driving shaft 161 of the stepping motor 16 with the carriage assembly 15 inserted between the guide bar 17 and the driving shaft 161. The guide bar 17 extends in parallel with the predetermined radial direction C and has one end 171 and another end 172 which are mounted on the frame main surface of the main frame 13 in the manner which later be described. The guide bar 17 guides the carriage assembly 15 along the predetermined radial direction C. As a result, the whole of the carriage assembly 15 is disposed apart from the frame main surface of the main frame 13.

In addition, a flexible printed circuit (FPC) 152 extends from the carriage assembly 15 to the vicinity of the guide bar 17 and the flexible printed circuit 152 are electrically connected to the main printed wiring board (which will later be described) attached to the frame back surface of the main frame 13.

The guide bar 17 is clamped on the frame main surface of the main frame 13 by a guide bar clamp 18. The guide bar clamp 18 is fixed on the frame main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 cannot be fixed on the frame main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13.

The lower carriage 15L of the carriage assembly 15 serves as a supporting frame for supporting the carriage assembly 15 slidably along the guide bar 17. The lower carriage 15L has a projecting portion (not shown) which projects into the frame main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed by performing die cutting, press working, and bending of a metal plate.

The eject plate 21 is mounted on the frame main surface of the main frame 13 slidably along the insertion direction A of the flexible disk and an opposite direction. In the manner which will later become clear, the eject plate 21 holds, in cooperation with the disk holder 22, the flexible disk on operating of the flexible disk drive. In addition, the eject plate 21 holds the flexible disk slidably along in the insertion direction A so as to allow the flexible disk drive to load the flexible disk therein along the insertion direction A and to allow the flexible disk drive to eject the flexible disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the spindle shaft of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will later be described, in a state where the flexible disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the frame main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counter-clockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
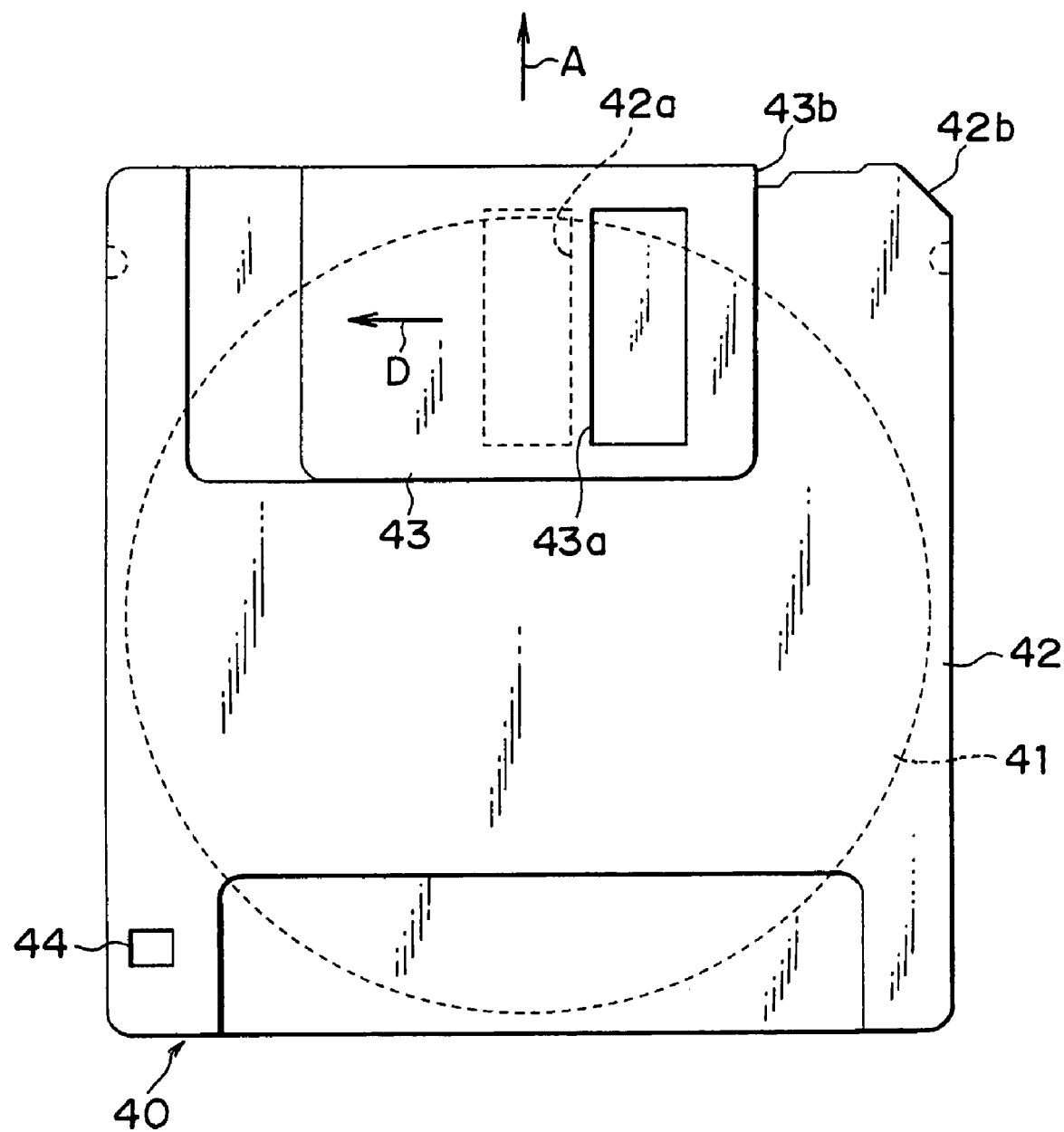
FIG. 3 is a plan view showing a flexible disk driven by the flexible disk drive.
Figure 4:
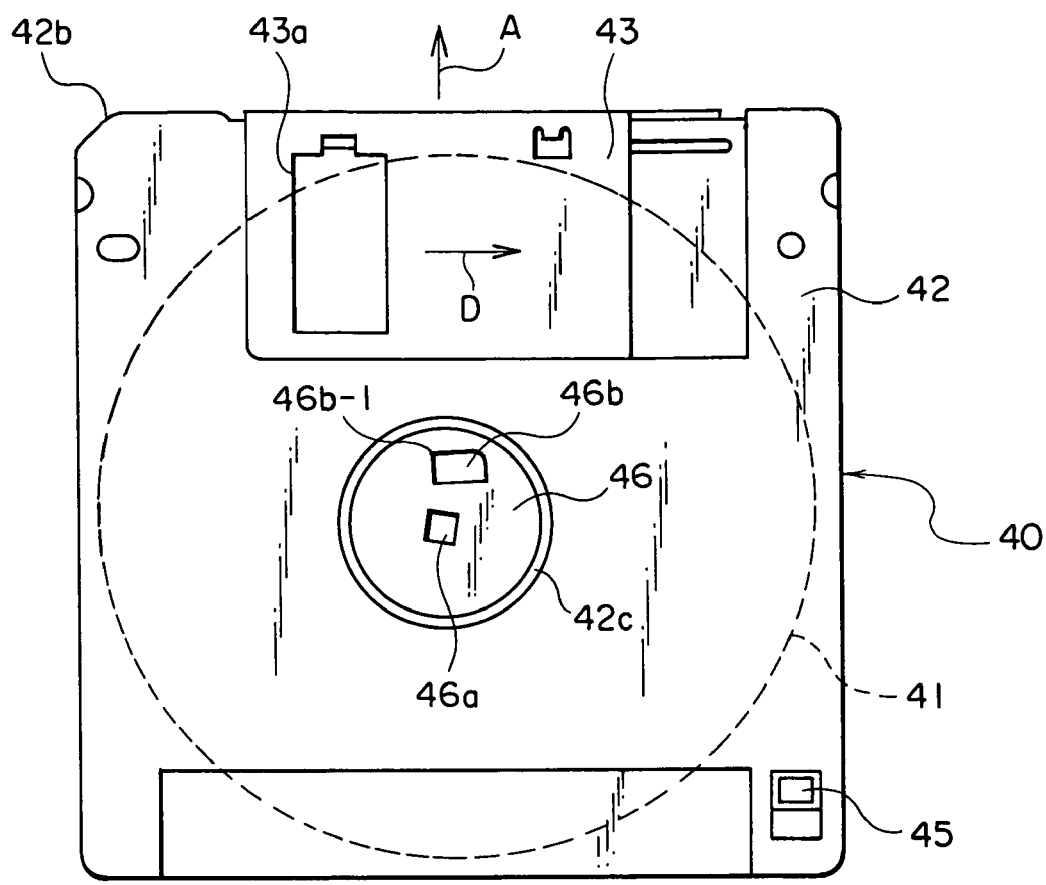
FIG. 4 is a bottom view of the flexible disk illustrated in FIG. 3.

Referring to FIGS. 3 and 4, the description will proceed to the flexible disk (FD) 40 driven by the flexible disk drive (FDD) illustrated in FIGS. 1 and 2. FIG. 3 is a plan view of the flexible disk 40 while FIG. 4 is a bottom view of the flexible disk 40.

The illustrated flexible disk 40 comprises a disk-shaped magnetic recording medium 41, a shell 42 for covering or receiving the magnetic recording medium 41, and the shutter depicted at 43 slidably in a direction indicated by an arrow D. The shell 42 is made of plastic and has a square shape. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 1 and 2) of the flexible disk drive. In a state where the flexible disk 40 is not loaded in the flexible disk drive, the head window 43a is covered by the shutter 43 as shown in FIG. 3. When the flexible disk 40 is loaded in the flexible disk drive, the projection part 242 of the eject lever 42 (FIG. 1) engages with the upper end 43b of the right-hand side edge of the shutter 43 to slide the shutter 43 in the direction depicted at the arrow D.

As shown in FIG. 3, the shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A.

FIG. 4 shows a state where the write protection hole 44 is closed by a write protection tab 45. The write protection tab 45 is slidable along the insertion direction A and it is possible to open and close the write protection hole 44 by manually operate it. The flexible disk 40 is put into a recordable state when the write protection hole 44 is closed by the write protection tab 45. The flexible disk 40 is put into a unrecordable state when the write protection hole 44 is opened by the write protection tab 45.

As shown in FIG. 4, a circular aperture 42a is formed in a bottom surface of the shell 42 at a center portion thereof. In the circular aperture 42a, a disk hub 46 for holding the magnetic recording medium 41 is freely received. The disk hub 46 is a disk-shaped metal fitting made of ferromagnetic metal. The disk hub 46 has a disk center hole 46a at a center portion thereof and a driving oval hole 46b at a position eccentric with the disk center hole 46a. The disk center hole 46a may be also called a chucking hole while the driving oval hole 46b may be also called a positioning hole. The disk center hole 46a has substantially a square shape and receives a tip portion 301a of the spindle shaft which will later be described. The driving oval hole 46b has substantially a rectangular shape and freely receives a driving pin which will later be described.

In the manner which will later become clear, the driving pin of the disk chucking mechanism is pushed to a radially outward corner portion 46b-1 of the driving oval hole 46b in the disk hub 46 on chucking the flexible disk 40.

As described above, in the flexible disk 40 driven by the flexible disk drive, the magnetic recording medium 41 accessed by the magnetic heads 14 (FIGS. 1 and 2) has a plurality of tracks (not shown) on a surface thereof that serve as paths for recording data and that are formed in a concentric circle along a radial direction. The flexible disk 40 has eighty tracks one side which include the most outer circumference track (the most end track) $TR_{00}$ and the most inner circumference track $TR_{79}$.

Figure 5:
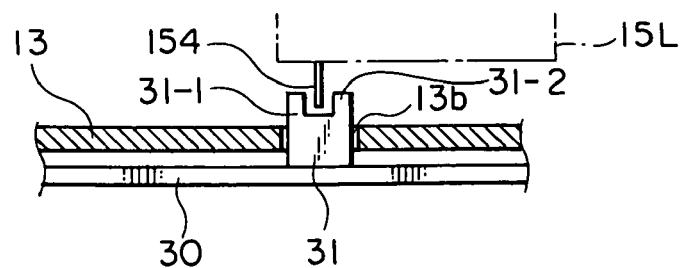
FIG. 5 is a sectional view for use in describing a set-up structure of a track position detecting mechanism (00 sensor) used in the flexible disk drive.

Referring to FIG. 5 in addition to FIG. 1, the description will proceed to a track position detecting mechanism (a 00 sensor) for detecting a position of the most end track $TR_{00}$ of the magnetic recording medium 41.

In the carriage assembly 15, the lower carriage 15L is provided with an interception plate 154 which projects from a base section thereof downwards. On the other hand, the main printed wiring board 30 is disposed on the frame back surface of the main frame 13 opposed to the carriage assembly 15. On the main printed wiring board 30, a photointerrupter 31, which is used as the track position detecting mechanism (the 00 sensor), is mounted. For this purpose, the main frame 13 has a bore 13b in which the photointerrupter 31 is inserted.

In the manner which is well known in the art, the photointerrupter 31 comprises a first protrusion section 31-1 into which a light-emitting element (which will later be described) is built and a second protrusion section 31-2 into which a light-receiving element (which will later be described) is built. The first protrusion section 31-1 and the second protrusion section 31-2 are opposed to each other at two opposite wall surfaces which have two opening sections (not shown), as shown in FIG. 5. Through the two opening sections, an optical path is formed to go from the light-emitting element to the light-receiving element. In addition, the above-mentioned interception plate 154 passes through a path between the first protrusion section 31-1 and the second protrusion section 31-2.

In the 00 sensor with such a structure, it is possible to detect that the magnetic heads 14 (FIGS. 1 and 2) are laid in the position of the most end track $TR_{00}$ in the magnetic recording medium 41 of the flexible disk 40 because the interception plate 154 intercepts the optical path in the photointerrupter 31.

Figure 6:
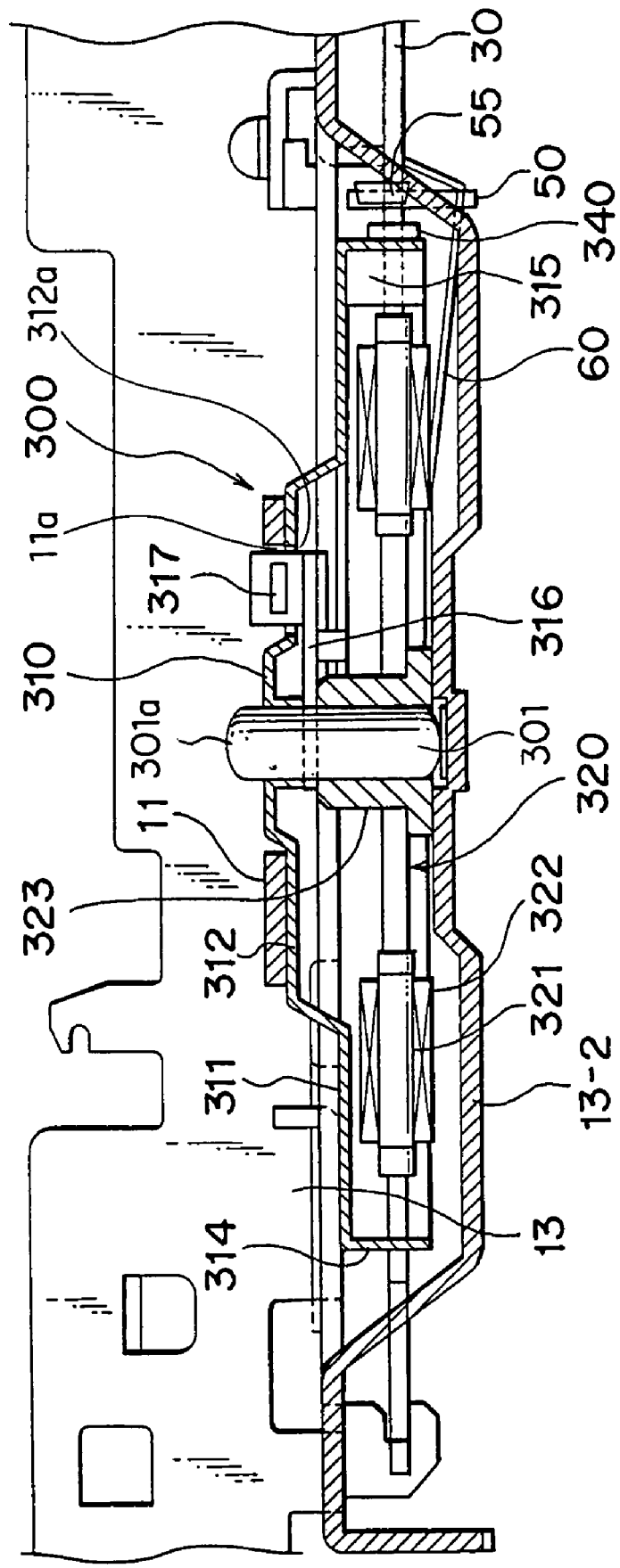
FIG. 6 is a sectional view showing a direct-drive motor (spindle motor) for use in the flexible disk drive illustrated in FIG. 1.
Figure 7:
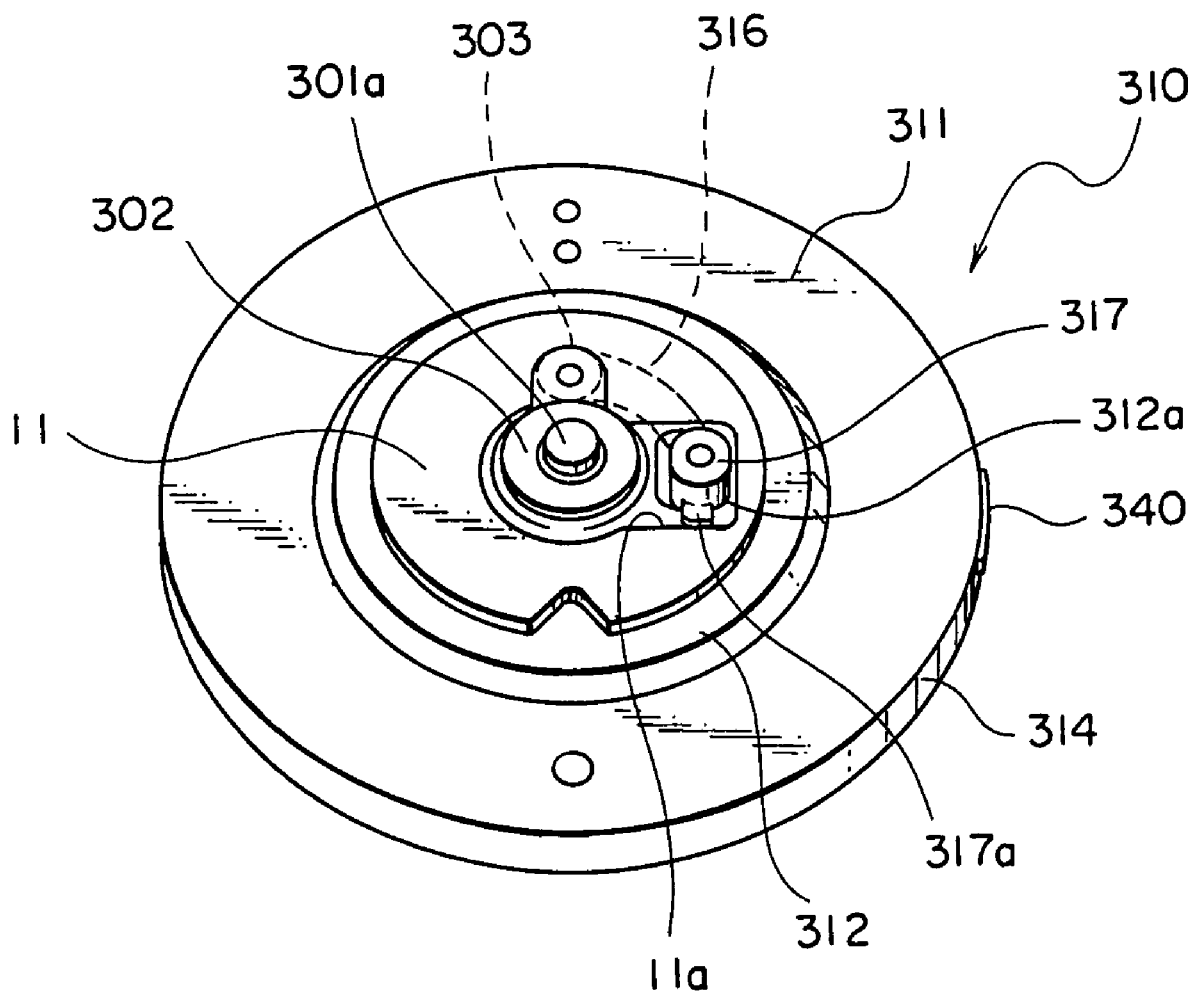
FIG. 7 is a perspective view showing a rotor of a spindle motor including a conventional disk chucking mechanism.

Referring now to FIGS. 6 and 7, the description will proceed to the DD motor (spindle motor) 300 for use in the above-mentioned flexible disk drive. FIG. 6 is sectional view of the spindle motor 300 while FIG. 7 is a perspective view showing a rotor 310 of the spindle motor 300 including a conventional disk chucking mechanism.

The illustrated DD motor 300 comprises the rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted.

The rotation axis (the spindle shaft) 301 made of metal is integrally fixed to the rotor 310 at the center thereof to pass through the casing 311 and the disk table 11. When the disk table 11 is injection-molded by the use of a plastic magnet, the casing 311 and the spindle shaft 301 are integrally assembled. The casing 311 has a cylindrical member 314 formed on its outer periphery to extend downward. A ring-shaped permanent magnet 315 is attached to an inner surface of the cylindrical member 314.

The permanent magnet 315 has a plurality of main magnetized elements along a circumferential direction thereof. The main magnetized elements are called driving magnetized portions.

In addition, as shown in FIGS. 6 and 7, an index detection magnet 340 is put on an outer circumferential wall of the cylindrical member 314 at a predetermined position.

The protruding portion 312 is provided with an arm 316 attached to a bottom surface thereof. A drive roller (the driving pin) 317 is mounted on the arm 316 at a free end thereof. The protruding portion 312 and the disk table 11 have generally rectangular holes 312a and 11a formed therein, respectively. Through these holes 312a and 11a, the drive roller (the driving pin) 317 projects upward from the disk table 11. The flexible disk 40 (FIGS. 3 and 4) received in the flexible disk drive is placed on the disk table 11. The drive roller 317 is inserted in and engaged with the driving oval hole 46b formed in the disk hub 46 (FIG. 4) of the flexible disk 40. Thus, the magnetic disk medium 41 (FIGS. 3 and 4) is rotated following the rotation of the rotor 310.

On the other hand, the stator 320 is attached to a motor frame part 13-2 of the main frame 13 in the manner which will later be described. The stator 320 comprises a core assembly having a plurality of stator cores 321, a plurality of stator coils 322, and a center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the DD motor 300 and rotatably supports the spindle shaft 301.

Figure 8:
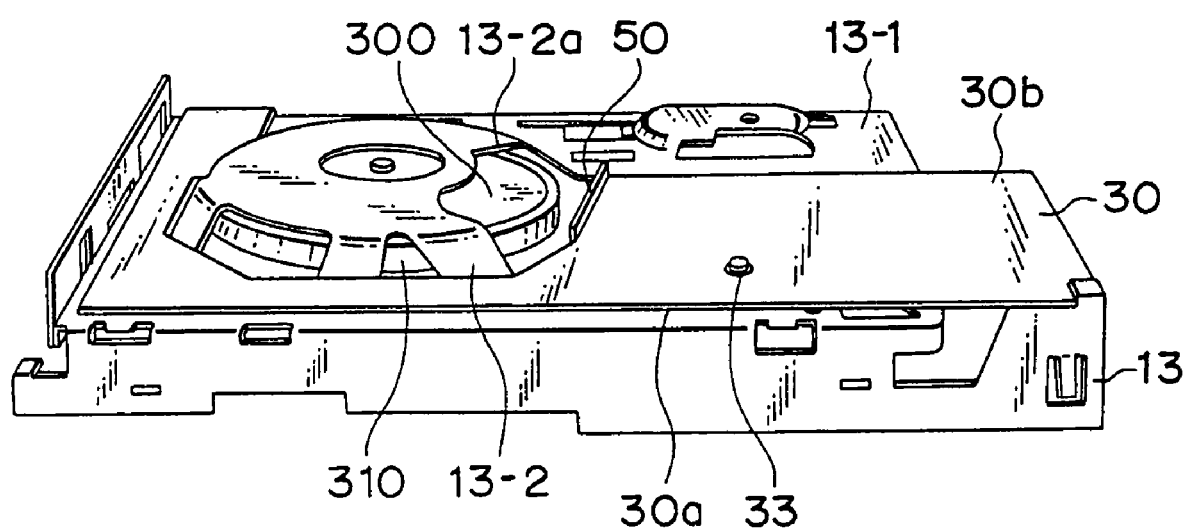
FIG. 8 is a schematic perspective view of a state where a main printed wiring board and a sub printed wiring board are mounted on a main frame for use in the conventional flexible disk drive as seen from the obliquely lower lateral side.

Referring now to FIG. 8, the description will proceed to a frame structure (the main frame) 13 for use in the flexible disk drive illustrated in FIGS. 1 and 2. FIG. 8 is a schematic perspective view of the main frame 13 as view from lower side obliquely.

In the manner as apparent from FIG. 8, the illustrated main frame (frame structure) 13 is composed of one piece in which the main frame part 13-1 and a motor frame part 13-2 are integrated. The main frame part 13-1 is made of magnetic material. The flexible disk 40 (FIG. 3) is inserted or loaded in the main frame part 13-1. The spindle motor 300 for rotatably driving the inserted flexible disk is mounted on the motor frame part 13-2. That is, the main frame 13 serves both as an original main frame and an original motor frame.

The motor frame part 13-2 has a drawn-shape obtained by drawing the main frame 13. The motor frame part 13-2 protrudes into the back side of the main frame 13 to form a top surface which is a part of the frame back surface of the main frame 13. In the top surface of the motor frame part 13-2, an opening window 13-2a for drawing out leads of the spindle motor 300 is formed.

In addition, although the drawn-shape of the motor frame part 13-2 illustrated in FIG. 8 is a circular shape, it is not restricted to this and may be a polygonal shape or an oval shape in response to depth or material of the motor frame part 13-2. In addition, a drawing shirked shape in the drawn-shape of the motor frame part 13-2 is also not restricted to that illustrated in FIG. 8 and may be various shapes. Furthermore, a connection way between the motor frame part 13-2 and the main frame part 13-1 is also not restricted to that illustrated in FIG. 8.

The illustrated flexible disk drive can adopt the main frame 13 having the above-mentioned shape because the flexible disk drive does not have a frequency generation pattern which is necessary to control driving of the spindle motor 300 and a printed wiring board on which the frequency generation pattern is formed. Moreover, motor-servo magnetized elements formed at the bottom portion of the permanent magnet 315 of the rotor 310 are unnecessary because the flexible disk drive does not have the frequency generation pattern. Instead, the flexible disk drive comprises an electronic processing unit which functions as a combination of the frequency generation pattern and the motor-servo magnetized elements. Operation of the electronic processing unit is similar to that described in the above-mentioned Japanese Unexamined Patent Application Publication No. 2001-178,185 or JP-A2001-178185. Inasmuch as the electronic processing unit only indirectly relates to this invention, the description thereof is omitted herein.

The main printed wiring board 30 of the illustrated flexible disk drive is attached to the frame back surface of the main frame part 13-1 of the main frame 13. As shown in FIG. 6, the main printed wiring board 30 has a shape such as to avoid overlapping with the motor frame part 13-2. The main frame part 13-1 has a supporting piece (not shown) which is raised from the frame back surface of the main frame part 13-1 by cutting and bending and which has a threaded hole formed in its tip portion. The main printed wiring board 30 is fixed to the supporting piece by a screw 33 engaged with the threaded hole so that a main surface 30a of the main printed wiring board 30 is spaced at a predetermined distance from the frame back surface of the main frame part 13-1 and a back surface 30b of the main printed wiring board 30 is nearer to the frame back surface of the main frame part 13-1 than the top surface of the motor frame part 13-2.

Figure 9:
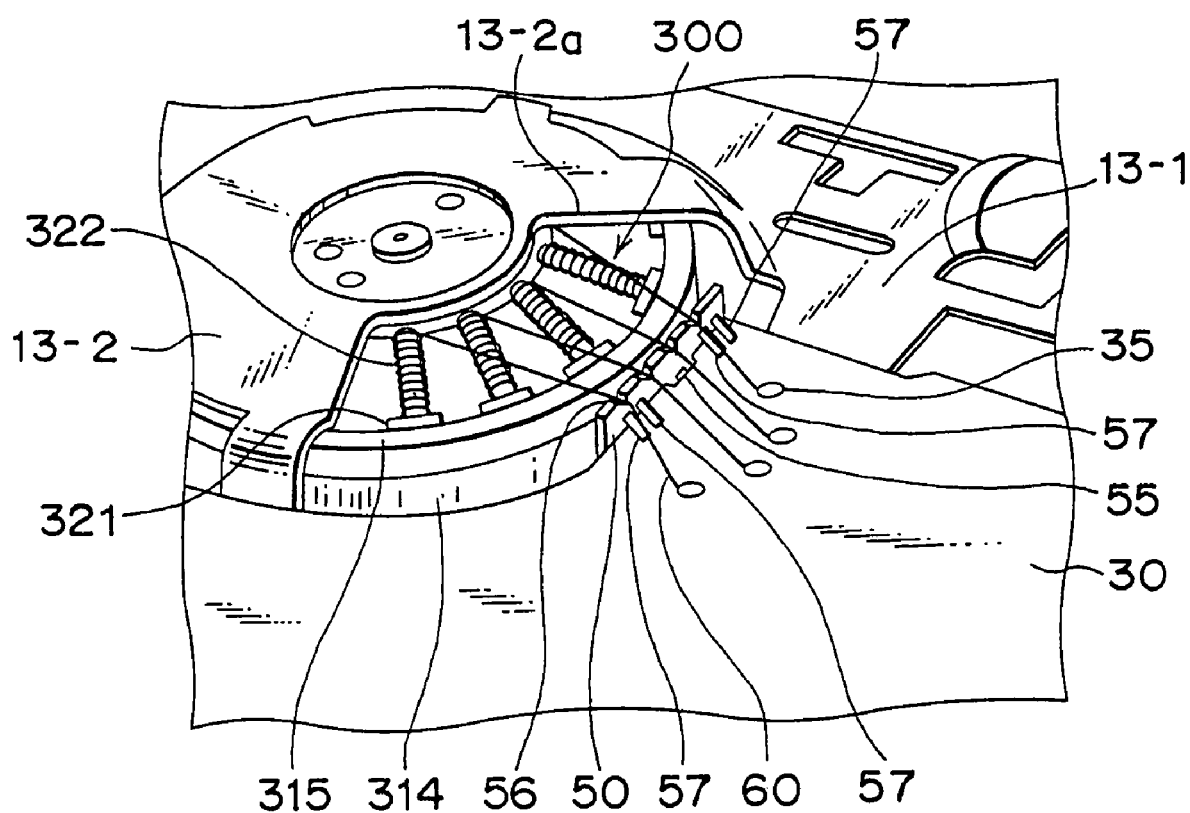
FIG. 9 is a view showing a state where leads are put on ditches of the sub printed wiring board illustrated in FIG. 8.

Referring to FIG. 9 in addition to FIG. 8, on the side of the frame main surface of the main frame 13, end portions (i.e. leads) of rotor coils wound around stator cores of the spindle motor 300 mounted on the motor frame part 13-2 are drawn out to the back side of the main frame 13 through the opening window 13-2a formed in the motor frame part 13-2 and are connected to predetermined terminals on the main printed wiring board 30. Generally, the leads 60 are equal in number to four. Three of the leads 60 correspond to U, V and W phases of the three-phase alternating current. The remaining one of the leads 60 is connected to the other ends of the leads of the U, V and W phases. The illustrated flexible disk drive further comprises a sub printed wiring board (a sub circuit board) 50. The sub printed wiring board 50 is for guiding the leads 60. On the sub printed wiring board 50, an index detection Hall element 55 is mounted. The sub printed wiring board 50 is for guiding the leads 60.

The main printed wiring board 30 extends in a direction perpendicular to the spindle shaft 301 of the spindle motor 300. On the other hand, the sub printed wiring board 50 is attached to the main printed wiring board 30 at a position close to an external peripheral side of the rotor 310 of the spindle motor 300 so as to extend in a direction in parallel with an axial direction of the spindle shaft 301 of the spindle motor 300.

In addition, the index detection Hall element 55 is attached on the sub printed wiring board 50 so that a magnetic field detection surface thereof is opposed to the external peripheral side surface of the rotor 310. In addition, the index detection Hall element 55 has four terminals (not shown) which are electrically connected to wiring (not shown) in the main printed wiring board 30 via solder 57. The solder 57 plays not only a role of such an electrically connection but also a role of a mechanical connection between the main printed wiring board 30 and the sub printed wiring board 50.

Drawn out from the opening window 13-2a, the leads 60 are held and fixed on the sub printed wiring board 50 with the leads 60 put on ditches 56 of the sub printed wiring board 50. The leads 60 have tips which are connected and fixed to predetermined terminals 35 of the main printed wiring board 30.

Turning back to FIG. 7, the description will proceed to the conventional disk chucking mechanism in more detail. The disk table 11 has substantially a ring shape having a diameter which is substantially equal to that of the disk hub 46. The disk table 11 is made of a plastic magnet for magnetically attracting the disk hub 46. The protruding portion 312 has a circular projection part on which a ring-shaped Teflon tape 302 is mounted. The Teflon tape 302 is for sliding the disk hub 46 assembled to the flexible disk 40 illustrated in FIG. 4.

The arm 316 has an end (a supporting end) which is rotatably supported on the protruding portion 312 by a supporting pin 303. In addition, on an upper surface of the protruding portion 312 exposed to the hole 11a of the disk table 11, a tongue piece 317a projecting from the driving pin 317 horizontally is slidably in contact with. Therefore, projected from the hole 312a of the protruding portion 312 upwards, the driving pin 317 is horizontally swingable within a range defined by a size of the hole 312a (in a surface in parallel with the upper surface of the protruding portion 312).

At any rate, the arm 316 serves as a supporting member rotatably mounted on a rear surface of the protruding portion 312 around a fulcrum (the supporting pin) 303 in a plane in parallel with the disk table 11. The arm (supporting member) 316 supports the driving pin 317 at a free end thereof with the driving pin 317 projected through the hole 312a of the protruding portion 312 and the hole 11a of the disk table 11.

Figure 10:
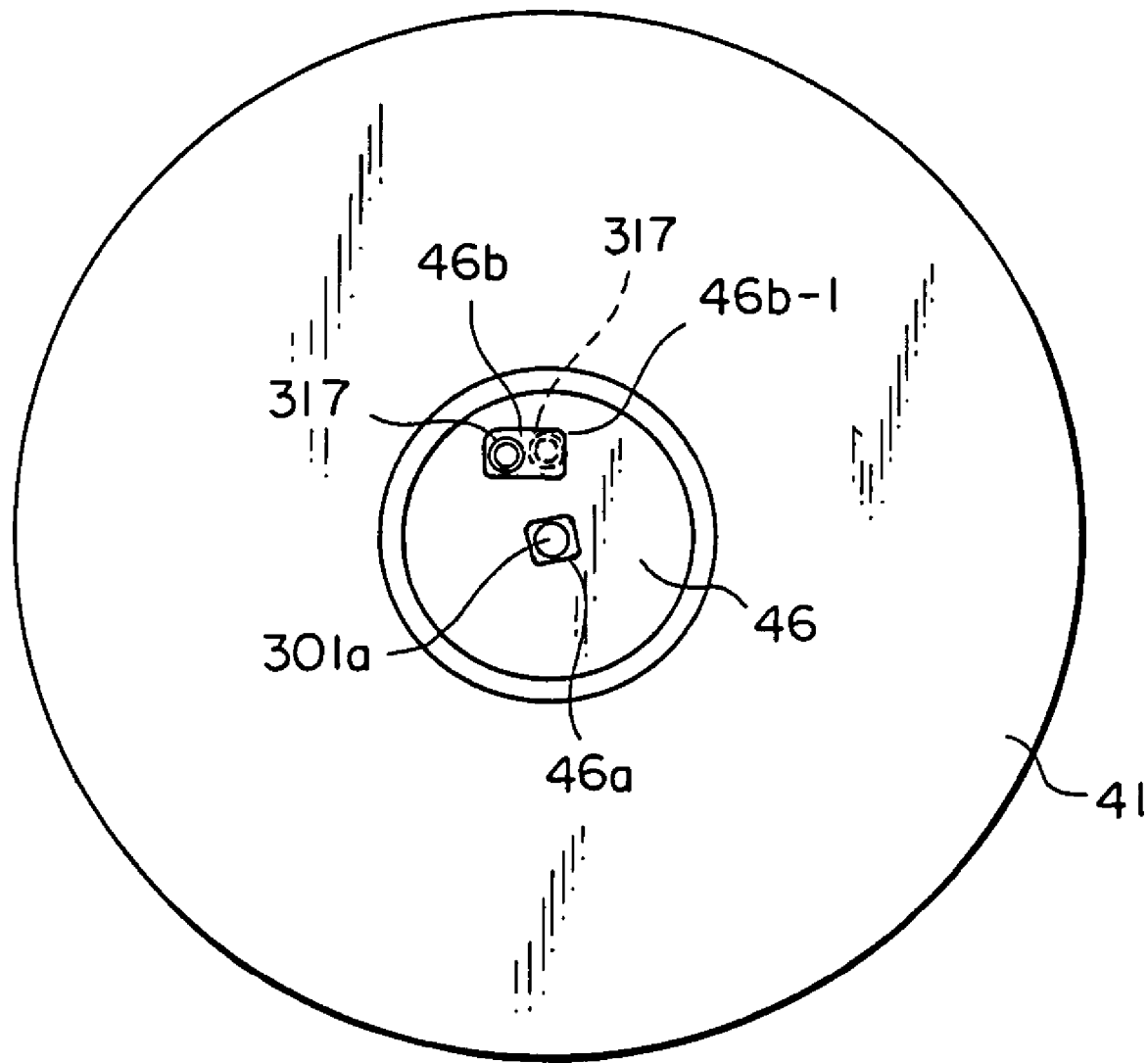
FIG. 10 is a plan view of the flexible disk on chucking with a shell thereof is omitted therefrom.

Referring now to FIG. 10 in addition to FIG. 7, description will be made as regards operation on chucking the disk hub 467 of the flexible disk 40 by the conventional disk chucking mechanism.

FIG. 10 is a plan view showing the flexible disk 40 on chucking with the shell 42 is removed therefrom. When the flexible disk 40 is inserted in the flexible disk drive, the disk hub 46 of the flexible disk 40 is magnetically attracted by the disk table 11. In this event, the tip portion 301a of the spindle shaft 301 is received in the disk center hole 46a of the disk hub 46.

On the other hand, the driving pin 317 may be freely received in the driving oval hole 46b of the disk hub 46 as shown in a solid line of FIG. 10. However, inasmuch as the driving oval hole 46b has an narrow occupied area in the disk hub 46, the driving pin 317 may almost hit on the disk hub 46 without being freely received in the driving oval hole 46b.

Although the driving pin 317 hits on the disk hub 46, the driving pin 317 is freely received in the driving oval hole 46b by rotating the disk tale 11 by the spindle motor 300 clockwise. After the driving pin 317 is freely received in the driving oval hole 46b, by rotating the disk table 11 by the rotor 310 of the spindle motor 300 clockwise, the driving pin 317 is pushed to the radially outward corner portion 46b-1 of the driving oval hole 46b, as shown in a broken line of FIG. 10. In the manner which is described, the disk hub 46 of the flexible disk 40 is chucked on the disk table 11.

Figure 11:
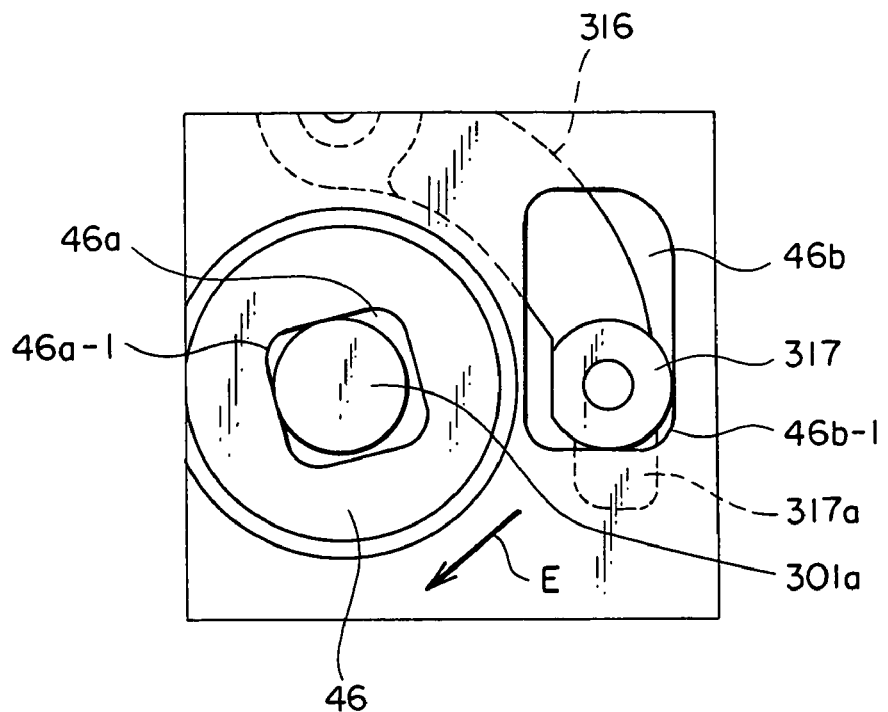
FIG. 11 is a partial enlarged detail of a state on chucking by the conventional disk chucking mechanism.

FIG. 11 is an enlarged view of a state on chucking by the conventional disk chucking mechanism. Inasmuch as the disk table 11 rotates clockwise by rotating the spindle motor 300 clockwise as shown in an arrow E of FIG. 11, the tip portion 301a of the spindle shaft 301 is pushed towards a corner portion 46a-1 of the disk center hole 46a in the disk hub 46. Accordingly, the tip portion 301a of the spindle shaft 301 is in contact with the disk center hole 46a of the disk hub 46 at both inner edges of the disk center hole 46a adjacent to the corner portion 46a-1 at two points. On the other hand, inasmuch as the driving pin 317 is pushed towards the radially outward corner portion 46b-1 of the driving oval hole 46b in that manner which is described above, the driving pin 317 is in contact with the driving oval hole 46b of the disk hub 46 at both inner edges of the driving oval hole 46b adjacent to the corner portion 46b-1 at two points.

That is, a position of the magnetic recording medium 41 is held at the above-mentioned four points contacted state on rotating the spindle motor 300.

Although the driving pin (projection) 317 engaged with the driving oval hole 36b has substantially a cylindrical shape in the conventional disk chucking mechanism illustrated in FIGS. 7 and 11, the projection may have a first contact part pressed to an inner edge of the driving oval hole (the positioning hole) in an outer periphery side of the disk table (turntable) and a second contact part pressed to an inner edge of the driving oval hole (the position hole) in an upper stream side of the disk table (turntable) in a rotation direction (e.g. see Japanese Patent Publication No. 2,664,995 or JP-B 2,664,995).

The above-mentioned flexible disk drive comprises the spindle motor 300 of a Hall sensor-less method. As a result, the spindle motor 300 forcibly rotates the rotor 310 by magnetizing the stator coils 322 on the basis of an inner logic on stating rotation of the spindle motor 300. On turning the motor on during synchronous operation, the rotor 310 of the spindle motor 300 may rotate in the opposite direction (counterclockwise) to an original rotation direction (clockwise) caused by a position relationship of the rotor 310 as shown in an arrow F of FIG. 12. It will be assumed that the stator cores 321 are equal in number to N. In this event, the rotor 310 of the spindle motor 300 may rotates in the opposite direction by the maximum an angle of (360/N) degrees. In addition, a number of N is called a pole number because the stator cores 321 are called poles. The pole number N is multiples of three. It will be assumed that the pole number N is equal to eighteen. In this event, the rotor 310 of the spindle motor 300 may rotate in the opposite direction by the maximum an angle of twenty degrees.

The synchronous operation is switched into a normal rotation operation at a time when counter-electromotive force of the stator coils 322 is detected. This switched time interval takes within 60 milliseconds.

Figure 12:
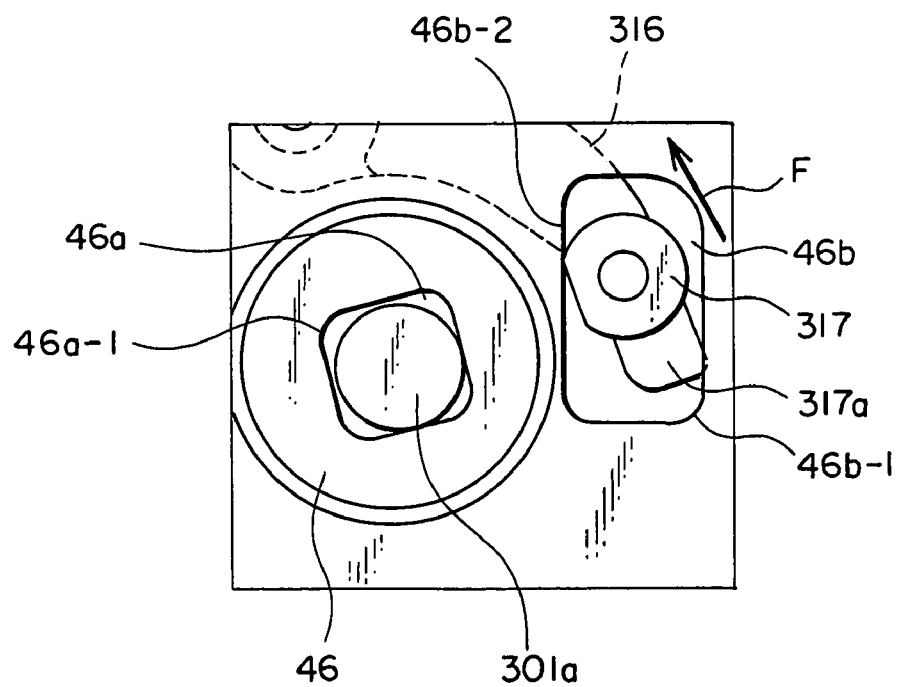
FIG. 12 is a partial enlarged detail of a state when the rotor of the spindle motor rotates in the opposite direction on turning the spindle motor on in the conventional disk chucking mechanism.

As shown in FIG. 12, when the rotor 310 of the spindle motor 300 rotates in the opposite direction (counterclockwise) on turning the motor on, the driving pin 317 is in contact with the driving oval hole 46b at an inner periphery edge 46b-2 thereof. As a result, the tip portion 301a of the spindle shaft 301 is different from in a case illustrated in FIG. 11 and is put into a shifted state within the disk center hole 46a (i.e. in a state apart from the corner portion 46a-1). Although the spindle motor 300 is switched into the normal rotation operation in such a state, the tip portion 301a of the spindle shaft 301 may not be completely turned back to a normal position as shown in FIG. 11. In other words, eccentricity may occur. That is, mischucking may occur because the rotor 310 of the spindle motor 300 rotates in the opposite direction. As a result, it makes reliability of the flexible disk drive lower, as mentioned in the preamble of the instant specification.

Such a phenomenon where the driving pin is in contact with the inner edge of the driving oval hole on reverse-rotation of the rotor of the spindle motor may occur in the disk chucking mechanism disclosed in the above-mentioned JP-B 2,664,995. This is because the projection has a portion which extends toward the arm than the first contact part in the driving oval hole and which projects from the driving oval hole upwards. This portion may be in contact with the inner edge of the driving oval hole on reverse-rotation of the spindle motor.

Figure 13:
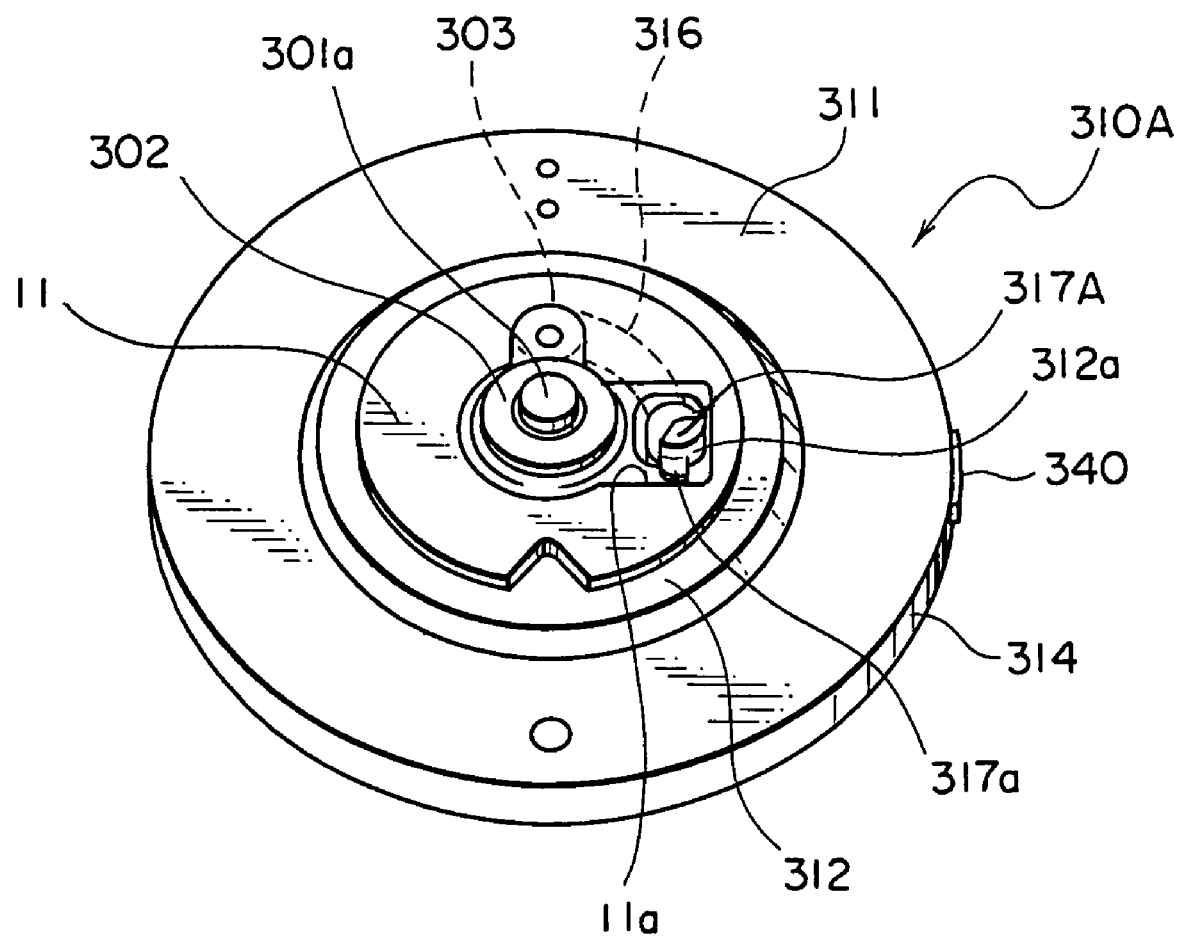
FIG. 13 is a perspective view showing a rotor of a spindle motor including a disk chucking mechanism according to an embodiment of this invention.

Referring to FIG. 13, the description will proceed to a disk chucking mechanism according to an embodiment of this invention. FIG. 13 is a perspective view showing a rotor 310A of a spindle motor including the disk chucking mechanism.

The illustrated disk chucking mechanism is similar in structure to that illustrated in FIG. 7 except that a shape of the driving pin (projection) is modified from that illustrated in FIG. 7 as will later become clear. The driving pin is therefore depicted at 317A. In addition, the same reference symbols are attached to components having functions similar to those illustrated in FIG. 7 and the description will be omitted for the purpose of simplification of the description.

The driving pin 317A has a shape of fan so as to cut a portion which extends toward the arm 316 in the driving oval hole 46b from a contact part in contact with an inner edge in an outer periphery side of the disk table 11 of the driving oval hole 46b and which projects from the driving oval hole 46b upward. Such a portion will be later called a catch factor portion in this specification. In other words, it will be assume that the spindle motor 300 has a pole number of N. In this event, the driving pin 317A has, as the shape where the catch factor portion is cut, a shape so that the driving pin 317A is not in contact with the inner edge of the driving oval hole 46b when rotor 310A rotates in the opposite direction from a position pushed to the radially outward corner portion 36b-1 of the driving oval hole 46b in the disk hub 46 by an angle of (360/N) degrees. Inasmuch as the pole number N is equal to eighteen in the example being illustrated, (360/N) degrees are equal to twenty degrees.

Inasmuch as the driving pin 317A has the shape so that the catch factor portion is cut in the manner which is described above, it is possible to be little possibility that the driving pin 317A is in contact with the inner edge of the driving oval hole 46b when the rotor 310A of the spindle motor 300 rotates in the opposite direction (counterclockwise).

Figure 14:
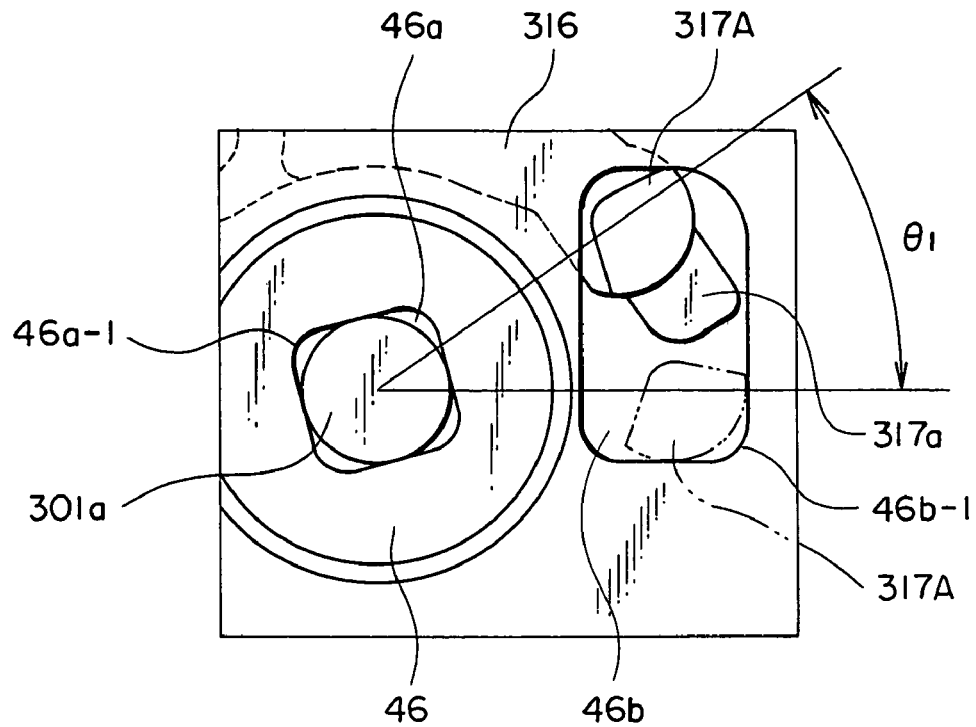
FIG. 14 is a partial enlarged detail showing an angle by which a driving pin is in contact with an inner edge of a driving oval hole from a position pushed to a radially outward corner portion thereof when the rotor of the spindle motor rotates in the opposite direction in the disk chucking mechanism illustrated in FIG. 13.
Figure 15:
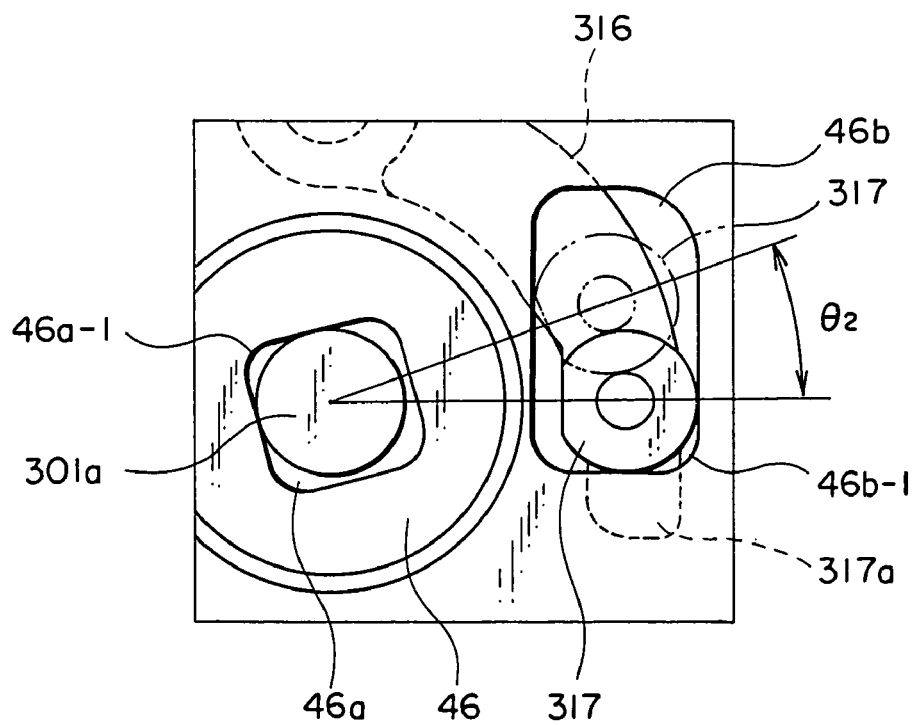
FIG. 15 is a partial enlarged detail showing an angle by which a driving pin is in contact with an inner edge of a driving oval hole from a position pushed to a radially outward corner portion thereof when the rotor of the spindle motor rotates in the opposite direction in the conventional chucking mechanism illustrated in FIG. 7.

FIG. 14 shows an angle $\theta_1$ by which the driving pin 317A is in contact with the inner edge of the driving oval hole 46b from the position pushed to the radially outward corner portion 46b-1 in the disk chucking mechanism according to this invention when the rotor 310A of the spindle motor 300 rotates in the opposite direction. In comparison with this, FIG. 15 shows an angle $\theta_2$ by which the driving pin 317 is in contact with the inner edge of the driving oval hole 46b from the position pushed to the radially outward corner portion 46b-1 in the convention disk chucking mechanism when the rotor 310 of the spindle motor 300 rotates in the opposite direction. As apparent from FIGS. 14 and 15, it is understood that the angle $\theta_1$ in the disk chucking mechanism according to this invention is wider than the angle $\theta_2$ in the conventional chucking mechanism, namely, $\theta_1 > \theta_2$. In the examples being illustrated, the angle $\theta_1$ is equal to about thirty-five degrees while the angle $\theta_2$ is equal to about eighteen degrees. In other words, the angle $\theta_1$ is about twice as large as the angle $\theta_2$.

Inasmuch as the shape of the driving pin 317A is the shape of fan where the catch factor portion is cut in the manner which is described above, the driving pin 317A is not in contact with the inner edge of the driving oval hole 46b unless the rotor 310A of the spindle motor 300 rotates in the opposite direction (counterclockwise) to the angle $\theta_1$ of about thirty-five degrees from an angular position where the driving pin 317A is pushed to the corner portion 36b-1 of the driving oval hole 46b although the rotor 310A of the spindle motor 300 rotates in the opposite direction (counterclockwise). As a result, it is possible to be little probability that the driving pin 317A is in contact with the inner edge of the driving oval hole 46b when the rotor 310A of the spindle motor 300 rotates in the opposite direction (counterclockwise).

Therefore, it is possible to prevent eccentricity from occurring and to prevent mischucking from occurring. It is possible to improve reliability of the flexible disk drive.

While this invention has thus far been described in conjunction with a preferred embodiment thereof, it is to be understood that modifications will be apparent to those skilled in the art without departing from the spirit of the invention. For example, the driving pin may have any shape where the above-mentioned catch factor shape is cut although the description has been made by way of example in a case where the driving pin has the shape of fan in the above-mentioned embodiment.

What is claimed is:

1. A disk chucking mechanism for chucking a disk hub made of ferromagnetic metal mounted in a center portion of a flexible disk in order to rotatably driving, by a spindle motor of a Hall sensor-less method, the flexible disk inserted in a flexible disk drive, said spindle motor comprising a rotor including a disk-shaped metallic casing and a spindle shaft, said disk hub having a disk center hole formed in the center portion thereof and a driving oval hole formed at a position eccentric with said disk center hole, said disk chucking mechanism being mounted on a protruding portion formed at a center of said disk-shaped metallic casing to protrude upward, wherein said disk chucking mechanism comprising:

a disk table mounted on said protruding portion, said disk table being for holding said disk hub, said disk table being made of plastic magnet for magnetically attracting said disk hub, said disk table having a center portion at which a tip portion of said spindle shaft to be received in said disk center hole passes through, said disk table having a hole at a position corresponding to said driving oval hole;

a driving pin freely received in said driving oval hole, said driving pin having a shape where a catch factor portion is cut; and a supporting member rotatably mounted on a rear surface of said protruding portion around a fulcrum in a plane in parallel with said disk table, said supporting member supporting said driving pin at a free end thereof with said driving pin projected through a hole of said protruding portion and the hole of said disk table.

2. A disk chucking mechanism as claimed in claim 1, wherein said driving pin has the shape of a fan.

3. A disk chucking mechanism as claimed in claim 1, said spindle motor comprising N poles, wherein said driving pin has the shape so that said driving pin is not in contact with an inner edge of said driving oval hole although said rotor rotates in the opposite direction from a position pushed to a radially outward corner portion of said driving oval hole by an angle of (360/N) degrees.

4. A flexible disk drive in which a flexible disk is inserted, said flexible disk comprising a disk hub made of ferromagnetic metal mounted in a center portion thereof, said disk hub having a disk center hole formed in the center portion thereof and a driving oval hole formed at a position eccentric with said disk center hole, said flexible disk drive comprising:

a spindle motor of a Hall sensor-less method for rotatably driving said flexible disk, said spindle motor comprising a rotor including a disk-shaped metallic casing and a spindle shaft, said disk-shaped metallic casing comprising a protruding portion formed at a center thereof to protrude upward; and a disk chucking mechanism for chucking said disk hub, said disk chucking mechanism being mounted on said protruding portion, wherein said disk chucking mechanism comprising:

a disk table mounted on said protruding portion, said disk table being for holding said disk hub, said disk table being made of plastic magnet for magnetically attracting said disk hub, said disk table having a center portion at which a tip portion of said spindle shaft to be received in said disk center hole passes through, said disk table having a hole at a position corresponding to said driving oval hole;

a driving pin freely received in said driving oval hole, said driving pin having a shape where a catch factor portion is cut; and a supporting member rotatably mounted on a rear surface of said protruding portion around a fulcrum in a plane in parallel with said disk table, said supporting member supporting said driving pin at a free end thereof with said driving pin projected through a hole of said protruding portion and the hole of said disk table.

5. A flexible disk drive as claimed in claim 4, wherein said driving pin has the shape of a fan.

6. A flexible disk drive as claimed in claim 4, said spindle motor comprising N poles, wherein said driving pin has the shape so that said driving pin is not in contact with an inner edge of said driving oval hole although said rotor rotates in the opposite direction from a position pushed to a radially outward corner portion of said driving oval hole by an angle of (360/N) degrees.

* * * * *